Patented Feb. 2, 1937

2,069,547

UNITED STATES PATENT OFFICE 2,069,547

PRODUCT AND PROCESS OF SULPHATION OF COMPOUNDS OBTAINED BY HYDROGENATION OF CARBON OXIDES

Richard G. Clarkson, Wilmington, Del., assignor to E. I. du Pont de Nemours & Company, Wilmington, Del., a corporation of Delaware No Drawing. Application August 5, 1933, Serial No. 683,903

19 Claims. (Cl. 260—99.12)

The present invention relates to a new composition of matter together with a method for its preparation and more particularly to the sulphuric acid derivatives of the mixture of higher oxygenated organic compounds obtained by the catalytic hydrogenation of carbon oxides under elevated temperatures and pressures.

In the catalytic hydrogenation of the oxides of carbon, there are produced, under certain conditions of operation, mixtures of oxygen-containing organic compounds of a higher order than methanol which products, usually of an oily consistency, comprise the saturated alcohols containing four or more carbon atoms together with saturated and unsaturated compounds such as the aldehydes, ketones, esters, and the like. A number of U. S. patents describe methods for the preparation of these compounds, e. g. 1,820,417 and 1,844,847. This heterogeneous mixture of compounds, usually having, initially, a more or less unpleasant odor, have a boiling point from 90° C. up. The whole mixture of oxygenated compounds boiling from approximately 90° C. up has been fractionated systematically into a series of fractions, namely 90–130; 130–147; 147–157; 157–175; 175–195; 195–225; 225–270; 270–280; and 290° C. up. Another particularly useful fraction has a boiling range overlapping the last three fractions and may be designated as constituting a fraction boiling above 240° C. All of these fractions will hereinafter be designated as the fractions of the higher oxygenated organic compounds. Due to the complexity of the mixture and of the individual compounds contained therein the composition of the whole has not been fully determined. It is known, however, that the total composition before separation into various fractions includes such compounds as normal propanol, isobutanol, 2-methyl butanol-1, 3-methyl butanol-2, 2,4-dimethyl pentanol-3, 3-pentanol-2, 4-methyl hexanol-1, 4-methyl heptanol-1, together with aldehydes, ketones, and esters, conforming closely in their number of alkyl groups to the alcohols above mentioned,— many other compounds are present but have not been individually identified. It is from this mixture of oxygenated organic compounds that I prepare my new composition of matter.

An object of the present invention is to provide a new composition of matter from the above designated mixture of higher oxygenated organic compounds. Another object of the present invention is to provide as a new composition of matter a sulphuric acid derivative of the mixture of higher oxygenated organic compounds obtained by the catalytic hydrogenation of carbon oxides under elevated temperatures and pressures. A still further object of the invention is to provide a process for the preparation of the sulphate esters of the mixture of higher oxygenated organic compounds. A still further object of the invention is to provide a series of mixtures of new compositions of matter having different chemical and physical characteristics which are obtained by treating with a strong sulphating agent various fractions of the higher oxygenated organic compounds above referred to. Other objects and advantages will hereinafter appear.

I have found that the sulphate esters of the mixtures of higher oxygenated organic compounds obtained from the catalytic hydrogenation of carbon oxides under elevated temperatures and pressures can be prepared by reacting the composite mixture or one or more of the indicated or other suitable fractions thereof with a strong sulphating agent, such as sulphuric acid of from 96–100% strength, fuming sulphuric acid, chlorsulphonic acid, sulphur trioxide, and the like. The temperature at which this mixture of compounds may be obtained may vary widely, e. g. between 0° and 100° C., but a temperature of 0–40° C. is preferred with the strong acids if it is desired to favor the formation of a maximum amount of true sulphate.

I shall now describe methods illustrating the details of my process for the preparation of the sulphuric acid derivatives of the oxygenated compounds, but it will be understood that the details given are merely illustrative and in no way limit the scope of my invention.

*Example 1.*—Fifty grams of a fraction of the oxygenated organic compound boiling between approximately 157° C. and 175° C. was, after diluting with fifty grams of carbon tetrachloride (other solvents inert to the acid may be used), cooled in ice to 0–5° C. The mixture was kept at approximately this temperature while ninety-four grams of oleum containing 65% $SO_3$ was added drop by drop in the course of two hours. The reaction mixture was then stirred for approximately 12 hours during which time the temperature of the mixture was permitted to rise to approximately room temperature. One hundred c. c. of water were added and the mixture was neutralized with sodium carbonate solution (other alkali or alkaline earth hydroxides or carbonates may, of course, be used to effect neutralization). The liquid was then evaporated to dryness in a steam bath and the solid product dried in vacuum oven at 90° C. The resulting product was a tan colored solid and was readily soluble in water, alcohol, and acetone.

*Example 2.*—Utilizing similar conditions and quantities, as indicated in Example 1, a mixture of oxygenated organic compounds boiling at 225–270° C. was converted to a sulphate ester by sulphonating with 50 grams of 65% oleum. The product was a solid of yellow color, and was soluble in water, alcohol, and acetone.

*Example 3.*—A mixture of oxygenated compounds boiling between 270–280° C. was sulphated as in the manner indicated in Example 1 and by equivalent proportions except that it was sulphonated with 65 grams of 65% oleum. The finished product was also a solid, had a red-brown color, and was soluble in water, alcohol, and acetone.

From a consideration of the above specification, it will be realized that any improvement in the product or process disclosed therein will come within the scope of the invention without sacrificing any of the advantages that may be derived therefrom.

I claim:

1. In a process for the preparation of the sulphuric acid derivatives of the mixture of higher oxygenated organic compounds obtained by the catalytic hydrogenation of carbon oxides under elevated temperatures and pressures the steps which comprise reacting the higher oxygenated compounds with a strong sulphating agent at a temperature of 0°–100° C. after solution of the mixture of compounds in a solvent inert to the sulphating agent.

2. In a process for the preparation of the sulphuric acid derivatives of the mixture of higher oxygenated organic compounds obtained by the catalytic hydrogenation of carbon oxides under elevated temperatures and pressures the steps which comprise reacting the higher oxygenated compounds with sulphuric acid of at least 75% strength, at a temperature of 0–100° C. after solution of the mixture of compounds in a solvent inert to the sulphuric acid.

3. In a process for the preparation of the sulphuric acid derivatives of the mixture of higher oxygenated organic compounds obtained by the catalytic hydrogenation of carbon oxides under elevated temperatures and pressures the steps which comprise reacting the higher oxygenated compounds with sulphuric acid of from 96–100% strength at a temperature of 0–100° C. after solution of the mixture of compounds in carbon tetrachloride.

4. As a new composition of matter a mixture of salts selected from the group consisting of alkali and alkaline earth salts, of the sulphate esters of the higher oxygenated organic compounds obtained from the catalytic hydrogenation of carbon oxides under elevated temperatures and pressures.

5. As a new composition of matter a mixture of alkali salts of the sulphate esters of the higher oxygenated organic compounds obtained from the catalytic hydrogenation of carbon oxides under elevated temperatures and pressures.

6. As a new composition of matter a mixture of sodium salts of the sulphate esters of the higher oxygenated organic compounds obtained from the catalytic hydrogenation of carbon oxides under elevated temperatures and pressures.

7. As a new composition of matter a mixture of sulphuric acid derivatives of the higher oxygenated organic compounds obtained from the catalytic hydrogenation of carbon oxides under elevated temperatures and pressures, the compounds prior to treatment with sulphating agent boiling above 90° C.

8. As a new composition of matter a mixture of sulphuric acid derivatives of the higher oxygenated organic compounds obtained from the catalytic hydrogenation of carbon oxides under elevated temperatures and pressures, the compounds prior to treatment with sulphating agent boiling between 270–280° C.

9. As a new composition of matter a mixture of sulphuric acid derivatives of the higher oxygenated organic compounds obtained from the catalytic hydrogenation of carbon oxides under elevated temperatures and pressures, the compounds prior to treatment with sulphating agent boiling between 157–175° C.

10. As a new composition of matter a mixture of sulphuric acid derivatives of the higher oxygenated organic compounds obtained from the catalytic hydrogenation of carbon oxides under elevated temperatures and pressures, the compounds prior to treatment with sulphating agent boiling above 240° C.

11. As a new composition of matter a mixture of water soluble salts selected from the group consisting of alkali and alkaline earth salts, of the sulphate esters of the higher oxygenated organic compounds obtained from the catalytic hydrogenation of carbon oxides under elevated temperatures and pressures.

12. In a process for the preparation of the sulphuric acid derivatives of the mixture of higher oxygenated compounds obtained by the catalytic hydrogenation of carbon oxides under elevated temperatures and pressures, the steps which comprise dissolving the mixture of higher oxygenated compounds in a solvent inert to the sulphating agent, reacting the resulting mixture with a strong sulphating agent at a temperature of 0–100° C., and after the sulphation has been carried out neutralizing the reaction products with an alkali selected from the group consisting of an alkali hydroxide, an alkali carbonate, an alkaline earth hydroxide, and an alkaline earth hydroxide, and separating from the reaction products the mixture of sulphuric acid salts of the compounds.

13. In a process for the preparation of the sulphuric acid derivatives of the mixture of higher oxygenated compounds obtained by the catalytic hydrogenation of carbon oxides under elevated temperatures and pressures, the steps which comprise dissolving the mixture of compounds in carbon tetrachloride, reacting the resulting mixture with sulphuric acid of from 96–100% strength at a temperature of from 0–100° C., and after the sulphation has been carried out neutralizing the reaction products with an alkali, and separating from the reaction products the mixture of alkali salts of the sulphuric acid derivatives of the mixture of compounds.

14. As a new composition of matter a mixture of sulphuric acid derivatives of the higher oxygenated organic compounds obtained from the catalytic hydrogenation of carbon oxides under elevated temperatures and pressures.

15. As a new composition of matter a mixture of the sulphuric acid derivatives of the higher oxygenated organic compounds obtained by the catalytic hydrogenation of carbon oxides under elevated temperatures and pressures, the compounds prior to the sulphating boiling above 120° C.

16. The process for the production of wetting agents for alkaline mercerizing liquors, which comprises reacting oleum at a temperature up to 80° C., with a fraction of oily products obtained by the catalytic reduction of oxides of carbon by means of hydrogen.

17. The process for the production of wetting agents for alkaline mercerizing liquors, which comprises reacting oleum at a temperature up to 80° C., with a fraction of oily products obtained by the catalytic reduction of oxides of carbon by means of hydrogen, and neutralizing the resulting product with an alkali.

18. A difficultly water-soluble product obtained by treating with oleum a fraction of oily products obtained by the catalytic reduction of oxides of carbon by means of hydrogen, which product contains sulphuric esters of alcohols contained in said oily products and is soluble in alkaline mercerizing liquors.

19. A neutralized difficultly water-soluble product obtained by treating with oleum a fraction of oily products obtained by the catalytic reduction of oxides of carbon by means of hydrogen, which neutralized product contains alkali metal salts of sulphuric esters of alcohols contained in said oily products and is soluble in alkaline mercerizing liquors.

RICHARD G. CLARKSON.